United States Patent
Porter (10) Patent No.: US 7,148,160 B2
(45) Date of Patent: Dec. 12, 2006

(54) WATER VAPOR BREATHABLE, LIQUID WATER RESISTANT MATERIAL

(75) Inventor: John Frederick Porter, St. Catharines (CA)

(73) Assignee: Saint-Gobain Technical Fabrics Canada, Ltd., Ontario (CA)

( * ) Notice: Subject to any disclaimer, the term of this patent is extended or adjusted under 35 U.S.C. 154(b) by 79 days.

(21) Appl. No.: 10/843,257

(22) Filed: May 11, 2004

(65) Prior Publication Data

US 2004/0214489 A1  Oct. 28, 2004

Related U.S. Application Data

(63) Continuation-in-part of application No. 10/731,767, filed on Dec. 9, 2003.

(60) Provisional application No. 60/432,316, filed on Dec. 10, 2002.

(51) Int. Cl.
*B32B 5/26* (2006.01)
*B32B 27/04* (2006.01)

(52) U.S. Cl. .............. 442/36; 442/2; 442/35; 442/38; 442/43; 442/45; 442/46; 442/49; 442/50; 442/57; 442/58; 442/148; 442/394; 442/401

(58) Field of Classification Search ........ 442/2, 442/35, 36, 38, 43, 45, 46, 49, 50, 57, 58, 442/148, 394, 401, 408
See application file for complete search history.

(56) References Cited

U.S. PATENT DOCUMENTS

| | | | |
|---|---|---|---|
| 3,338,992 A | 8/1967 | Kinney | |
| 3,341,394 A | 9/1967 | Kinney | |
| 3,502,763 A | 3/1970 | Hartman | |
| 3,542,615 A | 11/1970 | Dobo et al. | |
| 3,692,618 A | 9/1972 | Dorschner et al. | |
| 3,802,817 A | 4/1974 | Matsuki et al. | |
| 3,832,214 A | 8/1974 | Wang | |
| 3,855,046 A | 12/1974 | Hansen et al. | |
| 4,041,203 A | 8/1977 | Brock et al. | |
| 4,194,041 A | 3/1980 | Gore et al. | |
| 4,340,563 A | 7/1982 | Appel et al. | |
| 4,725,481 A | 2/1988 | Ostapchenko | |
| 4,808,675 A | 2/1989 | Twilley et al. | |
| 5,145,727 A | 9/1992 | Potts et al. | |
| 5,169,706 A | 12/1992 | Collier et al. | |
| 5,169,712 A | 12/1992 | Tapp | |
| 5,178,931 A | 1/1993 | Perkins et al. | |
| 5,188,885 A | 2/1993 | Timmons et al. | |
| 5,208,098 A | 5/1993 | Stover | |

(Continued)

FOREIGN PATENT DOCUMENTS

JP    2002 172739 A    6/2002

OTHER PUBLICATIONS

Obermeyer, trade literature, Feb. 10, 2004, pp. 1-2.

(Continued)

*Primary Examiner*—Ula C. Ruddock
(74) *Attorney, Agent, or Firm*—Duane Morris LLP (57) ABSTRACT

The present invention relates to a composite sheet material that is water vapor permeable and substantially liquid water impermeable. The composite sheet material includes an outer layer, a film, and a reinforcing layer and, preferably, has an ASTM D3833 water vapor transmission rate of greater than 250 $g/m^2$/day, and a tensile strength of at least about 100 N/5 cm when tested in accordance with ASTM D5035. The sheet material is useful as a membrane for roofing, housewrap, insulation facing and in the fabrication of protective apparel.

23 Claims, 3 Drawing Sheets

U.S. PATENT DOCUMENTS

| | | |
|---|---|---|
| 5,208,313 A | 5/1993 | Krishnan |
| 5,283,112 A | 2/1994 | Krishnan |
| 5,733,824 A * | 3/1998 | Brunka et al. ............. 442/153 |
| 5,869,408 A | 2/1999 | Porter et al. |
| 5,881,521 A | 3/1999 | Porter et al. |
| 5,895,301 A | 4/1999 | Porter et al. |
| 6,046,118 A | 4/2000 | Jones et al. |
| 6,071,834 A | 6/2000 | Martz |
| 6,100,208 A | 8/2000 | Brown et al. |
| 6,171,689 B1 | 1/2001 | Kaytor et al. |
| 6,187,696 B1 | 2/2001 | Lim et al. |
| 6,238,767 B1 | 5/2001 | McCormack et al. |
| 6,274,520 B1 * | 8/2001 | Cordell ....................... 442/381 |
| 6,286,145 B1 | 9/2001 | Welchel et al. |
| 6,352,948 B1 | 3/2002 | Pike et al. |
| 6,355,333 B1 | 3/2002 | Waggoner et al. |
| 6,410,465 B1 | 6/2002 | Lim et al. |
| 6,649,548 B1 | 11/2003 | Shawver et al. |
| 6,766,817 B1 | 7/2004 | da Silva |

OTHER PUBLICATIONS

The North Face Footwear, trade literature, Feb. 10, 2004, pp. 1-5.
Tyvek, trade literature, Feb. 10, 2004, pp. 1-3.
News from Orvis, trade literature, Feb. 10, 2004, pp. 1-8.
Xavan BF, "Moisture Control and Air Tight Sheet", translation of Japanese presentation, 2004, pp. 1-13.
International Search Report dated May 17, 2004.

* cited by examiner

WATER VAPOR BREATHABLE, LIQUID WATER RESISTANT MATERIAL

CROSS-REFERENCE TO RELATED APPLICATIONS

This application is a continuation-in-part of U.S. application Ser. No. 10/731,767, filed Dec. 9, 2003, which was provisionally filed on Dec. 10, 2002 as U.S. application Ser. No. 60/432,316.

FIELD OF THE INVENTION

The present invention relates to a moisture vapor permeable, substantially liquid impermeable, composite sheet material.

BACKGROUND OF THE INVENTION

Sheet materials are widely available for wrapping the exterior surfaces of buildings prior to the attachment of siding materials. Housewraps, as they are called in the trade, restrict the passage of rain water and ambient air from entering the interior of a building, permit water vapor to escape and help to contain "conditioned" air in the interior of the structure.

Some housewraps that are currently in the marketplace include TYVEC®, a high density polyethylene spun-bonded sheet material from duPont Company, Wilmington, Del., TYPAR housewrap, spun-bonded polypropylene fiber mat material from Reemeay, Inc., Old Hickory, Tenn. and RUFCO-WRAP, a microperforated polyethylene sheet material sold by Raven Industries, Inc., Sioux Falls, S.D.

More recently, laminated barrier strips have been available to effectively reduce air and water leakage at gaps and joints in sheathing material. One such product is THERMO-BRITE tapes available through Parsec, Incorporated, Dallas, Tex. Such tapes are specially designed with pressure-sensitive adhesive strips and paper release backing layers for easy application at a job site. The tapes can be applied to sheathing joints, sheathing damage, window and door openings, electrical conduits and plumbing lines, for example. They are typically provided in two inch or four inch widths. Like housewrap material, such tapes resist the penetration of liquid water and reduce air leakage. Such products have recently been reported in U.S. Pat. No. 5,374,477 dated Dec. 20, 1994 and European Patent Application No. 399,952 published on Nov. 28, 1990.

While these adhesive-backed barrier strips and housewraps provide a breathable water barrier for joints and gaps between structural members of a building, they are typically manufactured from rather expensive polymeric sheet or foam materials which incorporate minute passageways between their major surfaces for permitting the passage of water vapor while restricting the passage of liquid water and air. Such specially-made polymeric materials are tough and resilient but do not retain nails very well, and are not flame retardant.

Breathable, liquid water retardant fabrics have also been used in soft structures where drape, hand and soft feel are of prime importance, such as in limited-use protective garments. TYVEC® from duPont has been used in protective garments and work-wear as well as in hazardous environments and other industrial uses. Such garments may be uncomfortable to wear for extended periods of time in warm conditions, and they are also not very durable, especially when wet laundered. Goretex® Teflon® fabric has also been used in garments, such as outerwear, with much success. Although Goretex® fabric is launderable, it is quite expensive.

Finally if a breathable, more cost-effective, water retardant fabric was available, many other uses could be economically pursued. For example, batt insulation and duct liner could be manufactured with such a facing. Additionally, envelopes could be made on a more cost-effective basis than those presently made with TYVEC® material.

Accordingly, there is a need for a composite sheet material that acts as a barrier to fluids, yet is also highly permeable to moisture vapor, with improved mechanical properties such as greater nail holding ability, better flame spread resistance, and more cost efficiencies for multiple uses.

SUMMARY OF THE INVENTION

The present invention provides a composite comprising a first outer layer, a water vapor permeable, substantially liquid water impermeable polymeric film and a reinforcing layer. This invention provides water retardant, breathable substrates which can be used as membranes for roofing, envelopes, housewrap, insulation facing and in the fabrication of protective apparel.

When designed for use in connection with roofing systems or exterior finishing systems, which may include exterior sheathing, stucco, brick, stone, or roofing tiles, for example, the membrane or housewrap of this invention presents a better breathability to water retardance ratio than TYVEC® housewrap, and when used in garment applications, is more cost-effective than Goretex® waterproof fabric. Because they are very cost-effective, the substrates of this invention can be used as facing material for insulation products, such as duct liner or batt insulation used to insulate commercial and residential buildings. When used as a facing, the substrates of this invention are breathable, yet substantially water resistant, and can be adhered to insulation products, such as those made from cellulosic, natural fibers, or inorganic fibers, such as glass or stone wool, etc. When used as a facing material, the substrates of this invention can include an additional adhesive, such as bituminous or polymeric resin adhesive, which may or may not contain a separate vapor barrier.

In a further embodiment of the present invention, a composite comprising an abrasion resistant, polyester nonwoven material, a water vapor permeable, substantially liquid water impermeable polyurethane film, and a polyester mesh laminated together is provided. The laminate includes an ASTM D3833 water vapor transmission rate ("WVTR") of greater than 250 g/m$^2$/day and an ASTM D5035 tensile strength of greater than about 100 N/5 cm. The preferred laminates and substrates of this invention have an areal weight of less than about 200 grams/m$^2$, an ASTM D5035 elongation greater than about 20%, and can withstand a hydrostatic head of water of greater than about 500 mm, in accordance with AATCC 127. These substrates also, when used as a housewrap or exterior underlayment, present greater nail pull strength and potentially greater flame resistance than a flash spun, high-density polyethylene nonwoven of like thickness and density, such as TYVEC® housewrap.

The substrates and laminates of this invention preferably include a water vapor permeable, substantially liquid water impermeable film layer. In the most preferred embodiments, this film layer includes a polyurethane film or coating. The preferred polyurethane film or coating can include microporosity (with pores having an average diameter of less than 1 micron), a hydrophilic portion, a hydrophobic portion, or a combination of these features, to permit water vapor to pass.

A BRIEF DESCRIPTION OF THE DRAWINGS

The accompanying drawings illustrate preferred embodiments of the invention according to the practical application of the principles thereof, and in which.

DETAILED DESCRIPTION OF THE INVENTION

Composite barrier strips, patches, layers, wraps and covers, building structures sealed with barrier laminates and processes for preparing barrier laminates and applying them to structures are provided by this invention. It is understood that these composite materials can be used for applications outside of the building and construction industry. For example, the breathable water-resistant composites of this invention could have application in the medical, filtration, packaging and garment industry as a substitute for surgical adhesive tapes, or as a substitute for TYVEC® material in envelopes, packaging tapes, or further, as a substitute for Goretex® fabrics, or spun bonded and microperforated polyolefins, for example.

The present invention relates generally to a moisture vapor permeable, substantially liquid impermeable composite sheet material. The composite sheet material of the present invention preferably includes a breathable film, a lightweight, open, nonwoven with high air permeability, and an open mesh reinforcement. There can, therefore, be a significant area of the breathable film that remains open to the atmosphere for moisture vapor breathing, yet tear strength is maximized. Alternatively, the mesh could be replaced with glass, nylon or natural fiber woven or nonwoven, for example. The optional coatings should exhibit adhesion to the film and nonwoven layers, in order to minimize chances for delamination. In addition, a polymer coating may help to reduce water wicking (and possible subsequent delamination) that could occur if a multifilament yarn edge, for example, was exposed to moisture. This can happen at cut edges and at holes—such as where nails or staples are used to hold the laminate onto the substrate.

Definitions

As used herein, the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include thermoplastics, thermosetting resins and all possible geometrical configurations of their molecules. These configurations include, but are not limited to isotactic, syndiotactic and random symmetries.

As used herein, the term "spunbond" fibers refers to small diameter fibers which are formed by extruding molten thermoplastic material as filaments from a plurality of fine, usually circular capillaries of a spinneret with the diameter of the extruded filaments then being rapidly reduced as, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, and U.S. Pat. No. 3,542,615 to Dobo et al. Spunbond fibers are generally not tacky when they are deposited onto a collecting surface. Spunbond fibers are generally continuous and have average diameters (from a sample of at least 10) larger than 7 microns, more particularly, between about 10 and 20 microns.

As used herein, the term "multilayer laminate" means a laminate having multiple layers which are of the same or different constructions. For example, the laminate can include a combination of spunbond and meltblown layers, such as a spunbond/meltblown/spunbond (SMS) laminate and others as disclosed in U.S. Pat. No. 4,041,203 to Brock et al., U.S. Pat. No. 5,169,706 to Collier, et al, U.S. Pat. No. 5,145,727 to Potts et al., U.S. Pat. No. 5,178,931 to Perkins et al. and U.S. Pat. No. 5,188,885 to Timmons et al. Such a laminate may be made by sequentially depositing onto a moving forming belt first a spunbond fabric layer, then a film and/or scrim, and last another spunbond layer and then bonding the laminate in a manner described below. Such fabrics preferably have a basis weight of from about 0.1 to 12 osy (3.4 to 400 gsm), or more particularly from about 0.75 to about 3 osy. Multilayer laminates may also have various numbers of meltblown layers or multiple spunbond layers in many different configurations and may include other materials like films (F) or coformed materials, e.g., SMMS, SM, SFS, etc.

As used herein, the term "thermal point bonding" involves passing a fabric or web of fibers to be bonded between a heated calendar roll and an anvil roll. The calendar roll is usually, though not always, patterned in some way so that the entire fabric is not bonded across its entire surface, and the anvil roll is usually flat. As a result, various patterns for calendar rolls have been developed for functional as well as aesthetic reasons. One example of a pattern has points and is the Hansen Pennings or "H&P" pattern with about a 30% bond area with about 200 bonds/square inch as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm). The resulting pattern has a bonded area of about 15%. Yet another common pattern is the C-Star pattern which has a bond area of about 16.9%. The C-Star pattern has a cross-directional bar or "corduroy" design interrupted by shooting stars. Other common patterns include a diamond pattern with repeating and slightly offset diamonds with about a 16% bond area and a wire weave pattern looking as the name suggests, e.g. like a window screen, with about a 19% bond area. Typically, the percent bonding area varies from around 10% to around 30% of the area of the fabric laminate web. The spot bonding holds the laminate layers together as; well as imparts integrity to each individual layer by bonding filaments and/or fibers within each layer.

As used herein, the term "ultrasonic bonding" means a process performed, for example, by passing the fabric between a sonic horn and anvil roll as illustrated in U.S. Pat. No. 4,374,888 to Bornslaeger.

As used herein, the term "nonwoven" material means a web having a structure of individual fibers or threads which may be interlaid, but might not be in an identifiable manner as in a knitted fabric. Nonwoven fabrics or webs have been formed from many processes such as for example, meltblowing processes, spunbonding processes, ultrasonic bonding processes, thermal point bonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

As a reference, the term "microfibers" means small diameter fibers preferably having an average diameter not greater than about 75 microns, for example, having an average diameter of from about 0.5 microns to about 50 microns, or more particularly, microfibers may have an average diameter of from about 2 microns to about 40 microns. Another frequently used expression of fiber diameter is denier, which is defined as grams per 9000 meters of a fiber and may be calculated as fiber diameter in microns squared, multiplied by the density in grams/cc, multiplied by 0.00707. A lower denier indicates a finer fiber and a higher denier indicates a thicker or heavier fiber. For example, the diameter of a polypropylene fiber given as 15 microns may be converted to denier by squaring, multiplying the result by 0.89 g/cc and multiplying by 0.00707. Thus, a 15 micron polypropylene fiber has a denier of about 1.42 ($15^2 \times 0.89 \times 0.00707 = 1.415$). Outside the United States the unit of measurement is more commonly the "tex", which is defined as the grams per kilometer of fiber. Tex may be calculated as denier/9.

Generally, to qualify as being "breathable" for the present invention, the resultant laminate should have a water vapor transmission rate (WVTR) of at least about 250 g/m²/24 hours (or day) as may be measured by a test method as described below. Furthermore, the films may be apertured.

In forming the films of this invention, the films may be coextruded to increase bonding and alleviate die lip buildup. Processes for forming composite materials are well-known. Details related to such manufacture are found in e.g., U.S. Pat. No. 6,238,767, herein incorporated by reference.

With reference to the figures, and particularly to FIGS. 1–6 thereof, various uses for the composite substrate 100 are explained in some detail. In a first embodiment of the composite substrate 100, a pair of nonwoven materials 10 and 40 are provided. Disposed there-between are film 12 and reinforcing layer 14. The nonwoven materials 10 and 40 are preferably combined with the film 12 and reinforcing layer 14 by a lamination process using heat, pressure, or a combination of such techniques. Alternatively, an adhesive, such as a hot-melt, air-curable, light-curable or heat-curable resin or glue can be used to join the individual layers together into a composite. The composite of this invention has many industrial uses, including protective apparel, construction substrates, envelopes, medical packaging and graphics, such as billboards.

Figure 2:
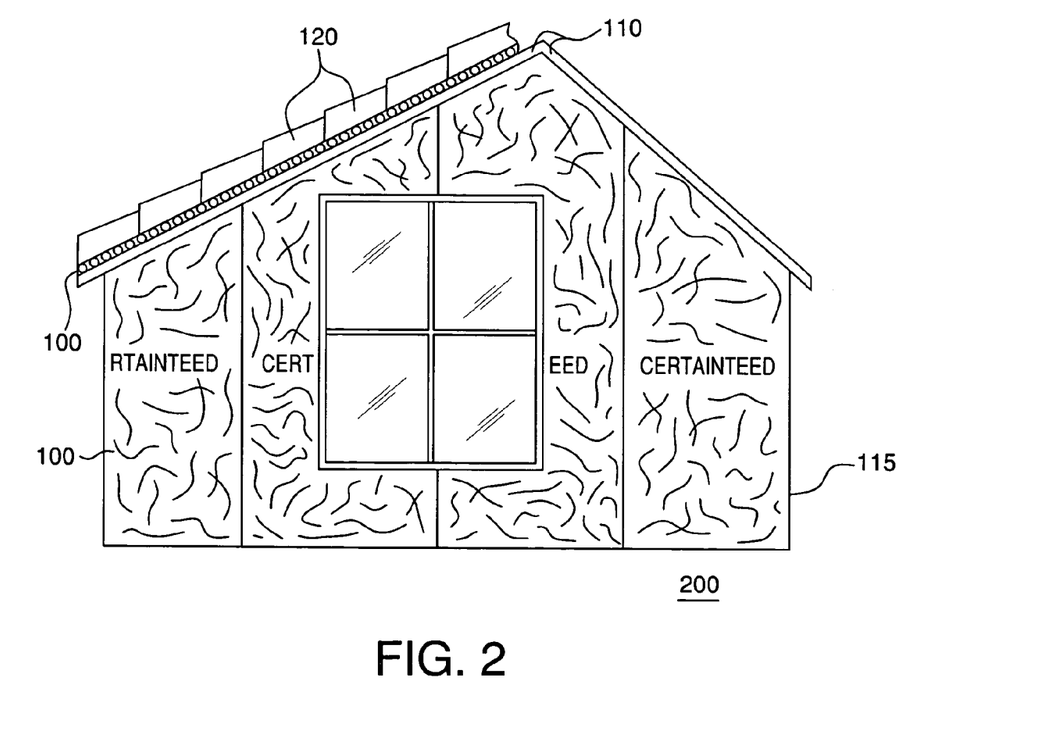
FIG. 2: is a front plan view of a building including the preferred composite substrate of FIG. 1 being applied to a side wall and also as a roofing membrane under a tile roof.

As shown in FIG. 2, the composite substrate 100 of this invention is ideally suitable for building construction. It is generally light-weight, preferably less than 200 grams/m², and more preferably about 100–200 grams/m², and can be disposed on building sidewalls 115, or beneath tile roofing material 120 above the roofing sheathing 110 of a building 200. The substrate 100 can be printed with the brand name of the company producing it, or other graphics, especially when used in billboards, graphics advertising products or services.

The composite substrate of this invention is preferably permeable to air and water vapor and is at least water retardant, if not substantially waterproof. When used for building construction, such as on top of roofing sheathing 110 or on building walls 115, the substrate 100 of this invention preferably is of a relatively hard or resilient structure which can bend but generally does not crease or tear and is not as drapable or as flexible as when the substrate 100 is used in protective garments or in outerwear, for example. Acceptable mechanical and material properties for these preferred embodiments are listed in Table 1 below:

TABLE 1

| Preferred Mechanical Properties | |
|---|---|
| WVTR: | |
| ASTM D3833 | >250 g/m²/day |
| | >500 g/m²/day, preferred |
| Hydrostatic Head: | |
| AATCC 127 | >500 mm H₂O |
| Tensile Strength | |
| ASTM D5035 | >100 N/5 cm |
| | >250 N/5 cm, preferred |
| Elongation (%) | |
| ASTM D5035 | >20% |
| Tear Resistance | |
| ASTM D2261 | >100 N/5 cm |
| | >250 N/5 cm, preferred |

When the composite substrate 100 is used in building 200 construction, it will generally be on the high side of the preferred ranges listed in Table 1. As a housewrap, the composite substrate 100 is light-weight and strong, vapor permeable, yet substantially water-resistant and tear-resistant. When used in connection with siding and finishing systems, such as exterior insulation systems (EIS) and exterior insulation and finishing systems (EIFS), the composite substrate 100 can be stapled to exterior sheathing followed by the application of foam insulation boards, or exterior sheathing materials, such as glass-faced gypsum board, vinyl siding, stucco, brick, stone or cement block. As such, the composite substrate 100 can be an integral part of a system.

When used as an underlayment for attachment to a roofing sheathing 110, the composite substrate 100 can be rolled over the roofing sheathing 110 and stapled thereto. Additional layers of tar paper are not necessary since the composite substrate 100 has water retardant properties. The tear resistance, abrasion resistance, and composite strength of the composite substrate 100 is ideal as a roofing membrane for tiled roofs, such as terra cotta, or slate roofing tiles, such as tile roofing material 120. The composite substrate 100 can also be configured into tapes or smaller rolls with or without adhesive or foil backing.

Figure 3:
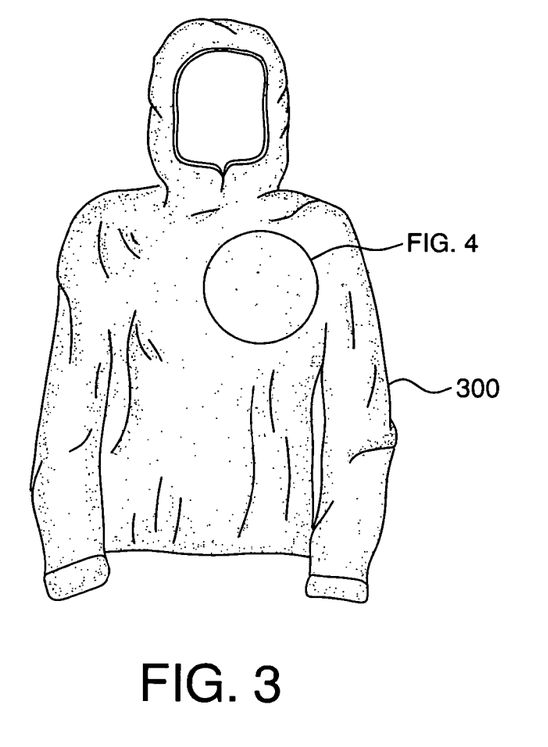
FIG. 3: is a front plan view of a protective garment of this invention including the substrate of FIG. 1.
Figure 4:
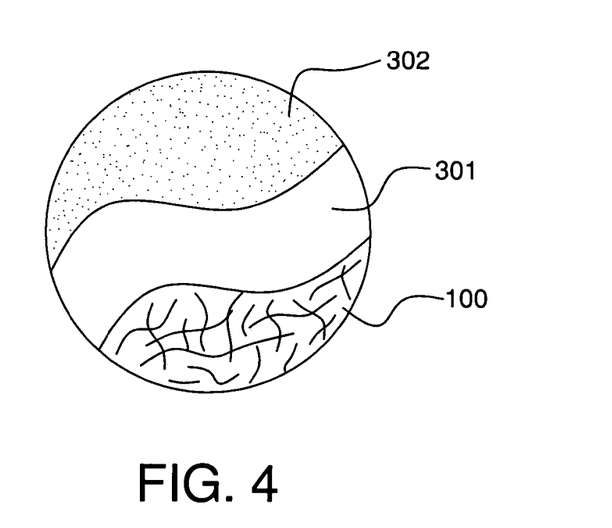
FIG. 4: is an enlarged peel-backed view of a portion of the garment of FIG. 3.

With reference to FIGS. 3 and 4, there is shown a protective garment 300, which could also be an outer garment used in inclement weather, or work wear, for example. Garments made from the composite substrate 100 can be used in hazardous environments or for general, non-hazardous industrial use. Hazardous environments may include, for example water-based acids, bases, salts and splashes of certain liquids, such as pesticides and herbicides. Such garments can also provide a reliable barrier against the exposure of harmful dry particles, such as lead dust, asbestos and particles containing radiation. Non-hazardous industrial uses include wearing the garments for "dirty jobs" at factories, hospitals, workshops, engineering plants, farms and construction sites.

As shown in FIG. 4, the composite substrate 100 of this invention, when used in garments, can further include an insulation layer 301, such as polyester, down feathers, or Thinsulate® insulation from 3M, combined with a outershell 302, such as a wind and water barrier made of polyester or nylon wovens, for example. The composite substrate 100 of this invention can be used in all kinds of protective garments and outerwear, including bi-layer jackets, sneakers and hiking boots, seawear and HazMat protective garments.

Figure 5:
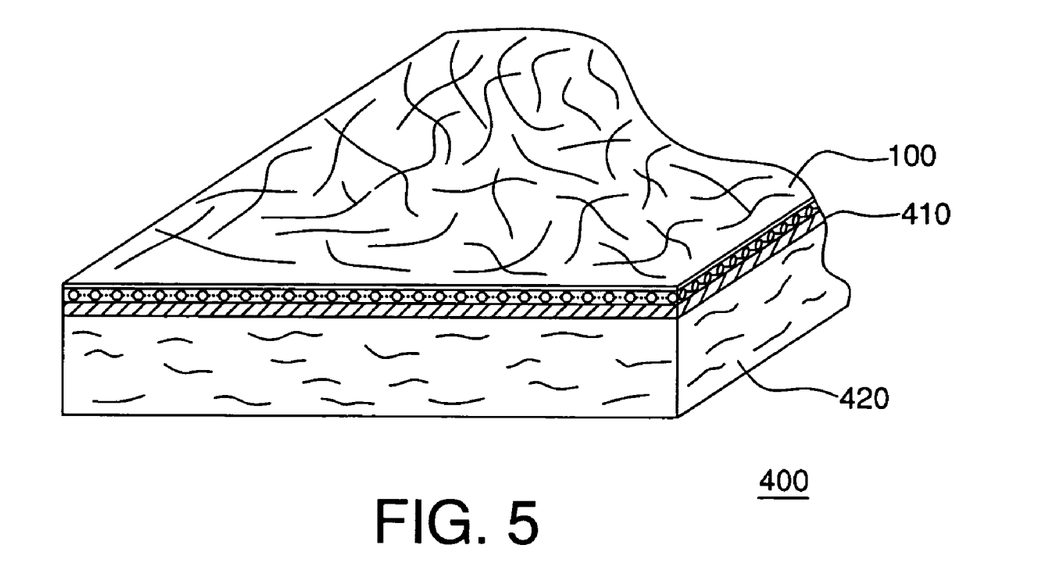
FIG. 5: is a partial, front perspective view of a preferred faced insulation product of this invention, including the substrate of FIG. 1.

With respect to FIG. 5, there is shown a further embodiment of this invention in the form of a faced insulation product 400. The faced insulation product includes an insulation layer 420 joined to a layer of the preferred composite substrate 100 with or without an adhesive layer 410. The insulation layer preferably is manufactured from inorganic, resinous and/or natural fibers, such as cotton shottie, rotary glass and/or textile glass. A preferred construction includes a rotary glass batt having an R-insulation value (such as R-13 or R-19), or a duct liner board made of rotary glass, textile glass, or a combination thereof.

As is usual in the case of manufacturing insulation products, the insulation fibers, such as glass fibers, are joined together with a resinous binder or adhesive to create a batt or board type product. Asphalt bituminous adhesive, or a hot-melt adhesive, is applied as an optional adhesive layer 410 which joins the composite substrate 100 to the batt insulation layer 420. The product can then be compressed and packaged with like batts in a polyethylene or paper bag for shipment.

Figure 6:
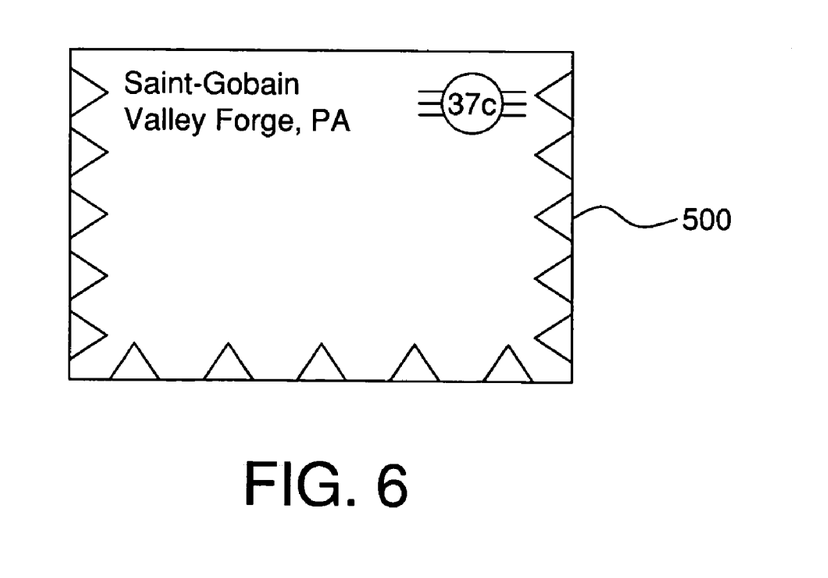
FIG. 6: is a front plan view of an envelope using the composite substrate of this invention.

In a further development of this invention, a envelope 500 is provided as shown in FIG. 6. The envelope 500 can include one or more seams for joining the composite substrate 100 into a closure which can be sealed with a flap extending from one of its end portions with a pressure-sensitive adhesive. The envelope, made from the composite substrate 100 of this invention preferably is printable, such as by a laser printer, and readily accepts pressure-sensitive labels.

Figure 1:
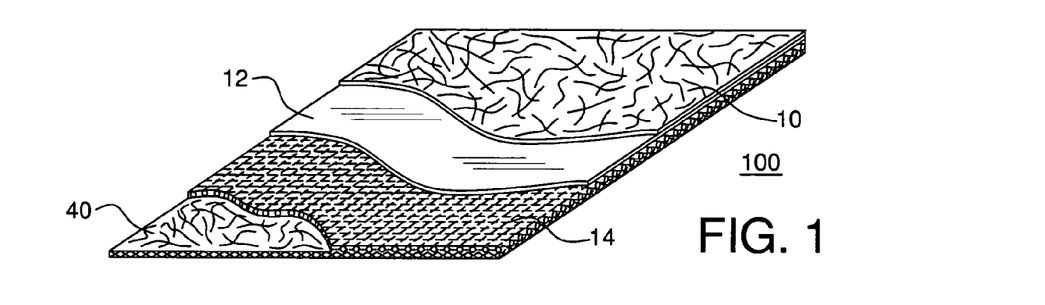
FIG. 1: is a front perspective, peel-backed view of a preferred composite substrate of this invention.

The preferred outer layers of the composite are abrasion resistant materials, such as woven, nonwoven, extruded or knitted fabrics. The outer layer or layers do not need to be water resistant and can be relatively open pore material and liquid water pervious. Ideally, the outer layers are open nonwovens. For example, nonwoven materials 10 and 40 are preferably laminated with the reinforcing mat or scrim materials to improve tensile strength. In the preferred embodiment of this invention the nonwoven layers include a tissue-like layer, or a tissue-like web made of polymer fibers. Ideal materials which have open pores and have an affinity towards resins are most preferred. These include one or more layers of nonwovens, wet laid, carded, or nonwoven layers including glass or synthetic fiber blends, such as polyester, polyethylene, or polypropylene.

The reinforcing layer 14, such as a mesh or scrim of this invention, is desirably made from a fibrous material having a "tensile strength," measured in pounds per square inch (psi.) which is significantly greater than the tensile strength of the polymeric nonwovens 10 and 40, for example at least 25% greater. The reinforcing layer 14, such as mesh, can be in the form of a knitted, braided, point bonded, nonwoven or woven material, such as a scrim or fabric. Preferred fibers include polyester, glass, rayon, or combinations thereof. Various deniers and scrim patterns could be used so long as the patterns provide for easy penetration by water vapor. In the most preferred embodiment, the reinforcing layer 14 has a relatively open porosity which contains pores which are significantly greater than the porosity of the film 12. More preferably the average diameter of the pores in the reinforcing layer 14 is greater than the average diameter of the pores in film 12 or nonwovens 10 and 40. The reinforcing layer 14 can even be liquid water pervious, since the film 12 will eventually be sufficient to preferably retard, or repel water by itself.

The preferred nonwovens 10 and 40 and reinforcing layer 14 are bonded, adhered or laminated together to form a single composite. Typical bonding and lamination procedures include those that involve adhering the nonwoven 10 and 40 and reinforcing layer 14 and film 12 together with or without an adhesive, or using heat, pressure or both to combine these materials. The resulting composite has a thickness of about 1–250 mils, preferably about 3–100 mils.

The preferred layers or materials of this invention can be coated or treated with additional compositions, including fire retardants, water resistant additives, vapor barriers, foils, adhesives, and hydrophilic or hydrophobic coatings or films.

Examples of materials which have been reported as being effective for improving the water-resistant properties of layers are the following: lattices of vinyl acetate, vinyl chloride, acrylics, acrylonitrile, and ethylene in addition to the monomers of styrene, butadiene, and isoprene, poly (vinyl alcohol), with or without a minor amount of poly (vinyl acetate); metallic resinates; wax or asphalt or mixtures thereof; a mixture of wax and/or asphalt and also cornflower and potassium permanganate; water insoluble thermoplastic organic materials such as petroleum and natural asphalt, coal tar, and thermoplastic synthetic resins such as poly(vinyl acetate), poly(vinyl chloride) and a copolymer of vinyl acetate and vinyl chloride and acrylic resins; a mixture of metal rosin soap, a water soluble alkaline earth metal salt, and residual fuel oil; a mixture of petroleum waxes in the form of an emulsion and either residual fuel oil and rosin, aromatic isocyanates and diisocyanates; organohydrogenpolysiloxanes; silicone oils and emulsions; a wax-asphalt emulsion with or without such materials as potassium sulfate, alkali and alkaline earth aluminates; a wax-asphalt emulsion prepared by adding to a blend of molten wax and asphalt an oil-soluble, water-dispersing emulsifying agent, and admixing the forementioned with a solution of casein which contains, as a dispersing agent, an alkali sulfonate of a polyarylmethylene condensation product. In the preferred embodiment of this invention, acrylic latex containing about 5–75% solids, preferably about 10–50% solids, is employed. Ideally, the acrylic latex will have a coating weight of about 15 to 80 wt. % of the dry weight of the uncoated laminate.

The preferred polymeric coating of this invention can impart strength, water resistance, tear properties, abrasion resistance, and weatherability to the selected web materials. In addition to the resin component, additional water repellants, for resisting water if glue or ink is applied before lamination; fluorochemical additives for imparting oil and/or water resistance; pigments, such as white pigment for improving opacity for print quality and appearance and improving UV resistance; crosslinking agents for improving wet strength, stiffness and reducing blocking in the laminated roll; and processing aides, to assist in the coating or saturating process, can be employed. Furthermore, a degree of flame retardance can be provided by the coating one or more layers with a flame retardant, preferably resinous compound, such as on the reinforcing layer 14. The coating may be, e.g., a polyvinyl chloride (PVC) polymer or copolymer, a polyurethane polymer or copolymer, an acrylic polymer or copolymer, a styrene-acrylic acid copolymer, a vinylidene chloride copolymer, or blends thereof. A polyvinyl chloride polymer or copolymer coating is preferred. Other additives will become apparent to those skilled in the art following the principles of this invention.

Lamination is preferably carried out in a post film formation step. In order for lamination to be feasible, the preferred moisture vapor permeable film 12 must have enough structure, tensile strength and tear strength such that the film can be formed, wound onto a roll, and later unwound and handled during the lamination process. The lamination can involve one or more methods; thermal lamination (melting an existing component), adhesive lamination (adding a liquid component just prior to laminating), ultrasonic lamination (a vibration process which softens or melts components, similar to thermal lamination), etc. It is extremely difficult to handle moisture vapor permeable films less than 20 microns (0.8 mil) in thickness during the adhesive lamination process without introducing holes into the film.

Thermal lamination of moisture vapor permeable films less than 20 microns thick has similarly resulted in composite sheet materials. Composite sheets can be made by thermally laminating a thin film 12 to a nonwoven. In addition, in order to carry out a thermal lamination, the film 12 must be subjected to elevated temperatures and pressures so as to soften the film 12 and force it into mechanical engagement with the other substrate components. Generally, the peel strength between the film 12 and the substrate 100, as a whole, increases with increasing extrusion melt temperatures and increasing nip pressures.

Extrusion coating processes are also available for coating a composite sheet with a thin moisture vapor permeable film of less than about 100 microns, and preferably less than about 20 microns (0.8 mil) that also has the liquid water barrier properties and moisture vapor transmission properties desirable for use in construction, envelopes, medical packaging, apparel and absorbent article applications. In an extrusion coating process, the polymer that forms the film is melted at an elevated temperature to reduce its viscosity such that when the polymer melt is coated onto the fibrous substrate and passed through a nip, the melt is pressed into engagement with the fibrous network of the substrate.

Because the components of the present invention are preferably polyester or polyester-containing materials, the flame retardancy may be increased with a polyester-active flame retardant. This is especially true if the PVC binder on the scrim is replaced with a polyester type binder.

The first and, optionally, second lightweight, nonwoven materials 10 and 40 may comprise polyester, polyolefin, rayon and polyamide fibers. The materials may be spunbond, thermal point-bonded or ultrasonically-bonded (for nonwovens); chemically-bonded (for polyester nonwoven webs); or hydraulically-entangled (for polyester webs). In a preferred embodiment of the present invention, the composite substrate 100 has an areal weight of greater than about 100 grams/square meter, with a weight from about 100–200 grams/square meter particularly preferred. In a further preferred embodiment of the present invention, polyester nonwoven materials further can include polyethylene terephthalate.

The preferred lamination techniques take place among and/or between layers and, preferably, lead to a thermal diffusion or a melt bond, thus further strengthening the waterproofing effects. Although a particularly preferred use for the present invention is as a membrane under terra cotta or slate tile roofing membranes, other end uses are also possible, e.g., as housewrap (wind barrier for building walls under siding, etc.), insulation facing, or alternatively, the material may be cut and sewn to make protective clothing.

The preferred substrate 100 can also be created by either coating a nonwoven or laminating a film to one or more nonwovens. The film approach may involve a film that is either microporous (containing millions of holes of diameter less than about 1 micron in diameter), or heterogeneous (with regions of hydrophobic polymer and regions of hydrophilic polymer within the same film). The present invention preferably combines two nonwovens 10 and 40 in order to protect the sensitive film 12 from abrasion, as well as a strong layer or mesh 14 which contributes to tensile, tear and puncture resistance, while keeping exposed portions of the film (in the openings of the reinforcing layer 14) free to breathe.

The product configurations of the present invention can achieve very high strength to weight ratios and exhibit very high strengths without a significant compromise in permeability. In addition, note that the prior art includes polypropylene (PP) laminates such as PPnonwoven/PPmicroporous film/PPnonwoven. These structures are intrinsically sensitive to variation in water vapor permeability or laminate strength. For example, if excessive heat is used, the microporosity can be reduced by thermal flow closing or shrinking the holes. Conversely, if insufficient heat is used, then delamination can occur. The use of contiguous but heterogeneous polyurethane films reduces the temperature sensitivity. In order to use this film more components should be used which are more heat resistant than PP, such as polyester.

EXAMPLE

A composite substrate embodiment of this invention was manufactured by laminating a polyester nonwoven, urethane film and scrim which had the following component details:

TABLE 2

Components of Preferred Embodiment Example

| Component | Details | Areal Weight (oz/yd2) | Supplier |
|---|---|---|---|
| Polyester nonwoven (1 or 2 layers) | Reemay 2250 spunbond | 0.5 (1 layer) or 1.0 (2 layers) | Reemay Inc. |
| Urethane film | 1.0 mil Duroflex X 1632 | 0.9 | Bayer |
| Scrim | QV5510/F34* | 1.7 | SGTF |
| Grand Total | 3 or 4 total layers | 3.1 (3 layers), 3.6 (4 layers) | SGTF |

TABLE 2-continued

| Component Description | Type | Weight | Details |
|---|---|---|---|
| MD Yarn | 500 denier HT polyester | 0.32 oz/yd2 | 5 ends/inch |
| CD Yarn | 500 denier HT polyester | 0.32 oz/yd2 | 5 ends/inch |
| Binder | Flexible PVC | 1.0 oz/yd2 | Coating on yarns |

*Scrim subassembly

The urethane film and scrim were joined between two polyester nonwovens in a lamination process which permitted the polyester nonwovens and the polyester scrim to form a melt bond in which the urethane film was partially exposed between the openings of the top $2^{nd}$ bottom polyester nonwovens. The following mechanical properties were measured:

TABLE 3

Mechanical Properties and Test Sample

| Manufacturer | Product | Areal Weight (g/m$^2$) | Tensile Strength (N/5 cm) | | Elongation (%) | | Tear Resistance (N/5 cm) | | Hydrostatic Head (mm H$^2$O) AATCC 127 | WVTR (g/m$^2$/day) ASTM D3833 | S$^d$ Coeff. (m) | Permeability to air (l/dm$^2$ × min) ASTM D737 | *note |
|---|---|---|---|---|---|---|---|---|---|---|---|---|---|
| | | | Length ASTM D5035 | Width ASTM D5035 | Length ASTM D5035 | Width ASTM D5035 | Length ASTM D2261 | Width ASTM D2261 | | | | | |
| Saint-Gobain | Terra-Tex | 159 | 530 | 380 | 28 | 27 | 428 | 337 | 1200 | >700 | | | |

Although the invention has been described in terms of exemplary embodiments, it is not limited thereto. Rather, the appended claims should be construed broadly to include other variants and embodiments of the invention which may be made by those in the art without departing from the scope and range of equivalents of the invention.

What is claimed:

1. A roofing system, comprising:
   a composite having three layers, comprised of, a water vapor permeable, substantially liquid water impermeable, porous polymeric film covered by an outer layer and further covered by a reinforcing layer;
   said film comprising one of, an extrusion coating or lamination, said film comprising polyurethane, which is spot bonded to said outer layer by melt bonds without adhesive;
   said outer layer comprised of, abrasion resistant, polymeric nonwoven fibers, wherein the polymeric fibers are melt bonded in the outer layer without adhesive;
   said reinforcing layer comprised of, a tear and puncture resistant, reinforcing mesh, said mesh being bonded without adhesive by melt bonds with said film to form said composite;
   said composite being stapled to roof sheathing of said roofing system to comprise an abrasion resistant and rain resistant roofing membrane; and
   a roofing material of said roofing system installed over said composite comprising said roofing membrane.

2. The roofing system of claim 1, wherein said roofing material comprises, slate tile or terra cotta tile.

3. The roofing system of claim 1, further comprising: said composite having a fourth layer, said fourth layer comprising, abrasion resistant, nonwoven polymeric fibers, wherein the polymeric fibers are melt bonded without adhesive in the fourth layer.

4. The roofing system of claim 1, wherein said film comprises a breathable polyurethane; said outer layer comprises an abrasion-resistant polyester nonwoven melt bonded without adhesive to said polyurethane, and said mesh comprises polyester fibers melt bonded without adhesive to said polyurethane.

5. The roofing system of claim 4, wherein said roofing material comprises, a slate tile or terra cotta tile.

6. An insulation product comprising:
   an insulation layer containing randomly oriented fibers joined together with an adhesive; said insulation layer comprising, an R-value insulation or a duct liner board; and
   a facing applied to at least one major surface of said insulation layer, said facing comprising:
   a composite having three layers, comprised of, a water vapor permeable, substantially liquid water impermeable, porous polymeric film covered by an outer layer and further covered by a reinforcing layer;
   said film comprising one of, an extrusion coating or lamination, said film comprising polyurethane, which is spot bonded to said outer layer by melt bonds without adhesive;
   said outer layer comprised of, abrasion resistant, polymeric nonwoven fibers, wherein the polymeric fibers are melt bonded in the outer layer without adhesive;
   said reinforcing layer comprised of, a tear and puncture resistant, reinforcing mesh, said mesh being bonded without adhesive by melt bonds with said film to form said composite; and
   said composite having an ASTM D5035 tensile strength of at least about 100 N/5 cm, and exhibiting resistance to liquid water transmission.

7. The insulation product of claim 6, wherein said facing is adhered to said insulation layer by an adhesive.

8. An exterior finishing system, comprising:
   a composite having three layers, comprised of, a water vapor permeable, substantially liquid water impermeable, porous polymeric film between an outer layer and a reinforcing layer;
   said film comprising one of, an extrusion coating or lamination, said film comprising polyurethane, which is spot bonded to said outer layer by melt bonds without adhesive;
   said outer layer comprised of, abrasion resistant, nonwoven polymeric fibers, wherein the polymeric fibers are melt bonded without adhesive in the outer layer;

said reinforcing layer comprised of, a tear and puncture resistant, reinforcing mesh, said mesh being bonded without adhesive by melt bonds with said film to form said composite;

said composite being stapled to sheathing of a building to comprise an abrasion resistant and rain resistant housewrap; and a foam insulation board or an exterior sheathing material of said exterior finishing system over said composite, wherein said exterior sheathing material comprises one of, glass-faced gypsum board, siding, stucco, brick, stone or cement block.

9. The exterior finishing system of claim 8, wherein said film comprises a breathable polyurethane; said outer layer comprises an abrasion-resistant polyester nonwoven melt bonded without adhesive to said polyurethane, and said mesh comprises polyester fibers melt bonded without adhesive to said polyurethane.

10. The exterior finishing system of claim 8, further comprising: said composite having a fourth layer, said fourth layer comprising, abrasion resistant, nonwoven polymeric fibers, wherein the polymeric fibers are melt bonded without adhesive in the fourth layer.

11. The exterior finishing system of claim 8, further comprising: said composite having a fourth layer, said fourth layer comprising, abrasion resistant, nonwoven polyester fibers, wherein the polyester fibers are melt bonded without adhesive in the fourth layer;

said film comprises a breathable polyurethane; said outer layer comprises an abrasion-resistant polyester nonwoven melt bonded without adhesive to said polyurethane;

said mesh comprises polyester fibers melt bonded without adhesive to said polyurethane; and said polyester fibers in said fourth layer are melt bonded without adhesive to said polyurethane.

12. An exterior finishing system, comprising:
a composite having three layers, comprised of, a water vapor permeable, substantially liquid water impermeable, porous polymeric film between an outer layer and a reinforcing layer;

said film comprising one of, an extrusion coating or lamination, said film comprising polyurethane, which is spot bonded to said outer layer by melt bonds without adhesive;

said outer layer comprised of, abrasion resistant, nonwoven polymeric fibers, wherein the polymeric fibers are melt bonded in the outer layer without adhesive;

said reinforcing layer comprised of, a tear and puncture resistant, reinforcing mesh, said mesh being bonded without adhesive by melt bonds with said film to form said composite;

said composite being stapled to sheathing of a building to comprise, an abrasion resistant and rain resistant, housewrap, or to comprise an abrasion resistant and rain resistant, roofing membrane.

13. The exterior finishing system of claim 12, wherein said film comprises a breathable polyurethane; said outer layer comprises an abrasion-resistant polyester nonwoven melt bonded without adhesive to said polyurethane, and said mesh comprises polyester fibers melt bonded without adhesive to said polyurethane.

14. The exterior finishing system of claim 12, further comprising: said composite having a fourth layer, said fourth layer comprising, abrasion resistant, nonwoven polymeric fibers, wherein the polymeric fibers are melt bonded without adhesive in the fourth layer.

15. The exterior finishing system of claim 12, wherein said film comprises a breathable polyurethane;

said outer layer comprises an abrasion-resistant polyester nonwoven melt bonded without adhesive to said polyurethane;

said mesh comprises polyester fibers melt bonded without adhesive to said polyurethane, and further comprising:

said composite having a fourth layer, said fourth layer comprising, abrasion resistant, nonwoven polyester fibers melt bonded without adhesive in the fourth layer; and the polyester fibers in the fourth layer being melt bonded without adhesive to said polyurethane.

16. The exterior finishing system of claim 12, wherein said composite comprises a housewrap, and further comprising:

a foam insulation board or an exterior sheathing material covering said housewrap; and said exterior sheathing material comprises one of, glass-faced gypsum board, siding, stucco, brick, stone or cement block.

17. The exterior finishing system of claim 12, wherein said composite comprises a housewrap, and further comprising:

a foam insulation board or an exterior sheathing material covering said housewrap;

said exterior sheathing material comprises one of, glass-faced gypsum board, siding, stucco, brick, stone or cement block;

said film comprises a breathable polyurethane;

said outer layer comprises an abrasion-resistant polyester nonwoven melt bonded without adhesive to said polyurethane; and said mesh comprises polyester fibers melt bonded without adhesive to said polyurethane.

18. The exterior finishing system of claim 12, wherein said composite comprises a housewrap, and further comprising:

a foam insulation board or an exterior sheathing material covering said housewrap;

said exterior sheathing material comprises one of, glass-faced gypsum board, siding, stucco, brick, stone or cement block;

said composite having a fourth layer comprising, abrasion resistant, nonwoven polymeric fibers, wherein the polymeric fibers in said fourth layer are melt bonded without adhesive in the fourth layer.

19. The exterior finishing system of claim 12, wherein said composite comprises a housewrap, and further comprising:

a foam insulation board or an exterior sheathing material covering said housewrap;

said exterior sheathing material comprises one of, glass-faced gypsum board, siding, stucco, brick, stone or cement block;

said composite having a fourth layer comprising, abrasion resistant, nonwoven polymeric fibers, wherein the polymeric fibers in said fourth layer are melt bonded without adhesive in the fourth layer;

said film comprises a breathable polyurethane; said outer layer comprises an abrasion-resistant polyester nonwoven melt bonded without adhesive to said polyurethane, said mesh comprises polyester fibers melt bonded without adhesive to said polyurethane, and the polymeric fibers of the fourth layer comprising polyester fibers melt bonded without adhesive to said polyurethane.

20. The exterior finishing system of claim 12, wherein said composite comprises a roofing membrane, and further comprising: a roofing material comprising, slate tile or terra cotta tile covering said roofing membrane.

21. The exterior finishing system of claim 12, wherein said composite comprises a roofing membrane, and further comprising: a roofing material comprising, slate tile or terra cotta tile covering said roofing membrane;
    said film comprises a breathable polyurethane; said outer layer comprises an abrasion-resistant polyester nonwoven melt bonded without adhesive to said polyurethane, and said mesh comprises polyester fibers melt bonded without adhesive to said polyurethane.

22. The exterior finishing system of claim 12, wherein said composite comprises a roofing membrane, and further comprising: a roofing material comprising, slate tile or terra cotta tile covering said roofing membrane, and further comprising:
    said composite having a fourth layer, said fourth layer comprising, abrasion resistant, nonwoven polymeric fibers, wherein the polymeric fibers are melt bonded without adhesive in the fourth layer.

23. The exterior finishing system of claim 12, wherein said composite comprises a roofing membrane, and further comprising:
    a roofing material comprising, slate tile or terra cotta tile covering said roofing membrane;
    said film comprises a breathable polyurethane;
    said outer layer comprises an abrasion-resistant polyester nonwoven melt bonded without adhesive to said polyurethane;
    said mesh comprises polyester fibers melt bonded without adhesive to said polyurethane;
and further comprising:
    said composite having a fourth layer, comprising, abrasion resistant, nonwoven polyester fibers, wherein the polyester fibers are melt bonded without adhesive in the fourth layer, and are melt bonded without adhesive to the polyurethane.

* * * * *